US011593891B2

(12) United States Patent
Shu et al.

(10) Patent No.: US 11,593,891 B2
(45) Date of Patent: Feb. 28, 2023

(54) SYSTEMS AND METHODS FOR A CROSS MEDIA JOINT FRIEND AND ITEM RECOMMENDATION FRAMEWORK

(71) Applicants:Kai Shu, Tempe, AZ (US); Suhang Wang, Tempe, AZ (US); Jiliang Tang, Tempe, AZ (US); Yilin Wang, Tempe, AZ (US); Huan Liu, Tempe, AZ (US)

(72) Inventors: Kai Shu, Tempe, AZ (US); Suhang Wang, Tempe, AZ (US); Jiliang Tang, Tempe, AZ (US); Yilin Wang, Tempe, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 832 days.

(21) Appl. No.: 16/525,148

(22) Filed: Jul. 29, 2019

(65) Prior Publication Data

US 2021/0272217 A1 Sep. 2, 2021

Related U.S. Application Data

(60) Provisional application No. 62/713,743, filed on Aug. 2, 2018.

(51) Int. Cl.
| | |
|---|---|
| *G06Q 50/00* | (2012.01) |
| *G06K 9/62* | (2022.01) |
| *G06Q 30/02* | (2012.01) |
| *G06N 5/02* | (2006.01) |
| *G06N 5/04* | (2006.01) |
| *G06Q 30/0282* | (2023.01) |
| *G06N 5/022* | (2023.01) |

(52) U.S. Cl.
CPC ........... *G06Q 50/01* (2013.01); *G06K 9/6249* (2013.01); *G06N 5/022* (2013.01); *G06N 5/04* (2013.01); *G06Q 30/0282* (2013.01)

(58) Field of Classification Search
None
See application file for complete search history.

(56) References Cited

U.S. PATENT DOCUMENTS

| | | | |
|---|---|---|---|
| 9,544,381 | B2 | 1/2017 | Zafarani et al. |
| 10,664,764 | B2 | 5/2020 | Gundecha et al. |
| 2009/0164475 | A1* | 6/2009 | Pottenger ............... G06F 16/958 |
| 2016/0171177 | A1* | 6/2016 | Caffarel ................ G16H 10/60 |
| | | | 705/3 |
| 2017/0212943 | A1 | 7/2017 | Li et al. |
| 2017/0213153 | A1 | 7/2017 | Wang et al. |
| 2019/0220471 | A1* | 7/2019 | Mota Toledo ......... G06N 7/005 |

(Continued)

FOREIGN PATENT DOCUMENTS

WO 2020061578 A1 3/2020

OTHER PUBLICATIONS

Qian, Shengsheng; "Cross-Domain Collaborative Learning via Discriminative Nonparametric Bayesian Model"; IEEE Transactions on Multimedia 20.8: 2086-2099. IEEE—Inst Electrical Electronics Engineers Inc. (Aug. 2018) (Year: 2018).*

(Continued)

*Primary Examiner* — Leland Marcus
(74) *Attorney, Agent, or Firm* — Polsinelli PC

(57) ABSTRACT

Various embodiments of systems and methods for cross media joint friend and item recommendations are disclosed herein.

16 Claims, 9 Drawing Sheets

(56) References Cited

U.S. PATENT DOCUMENTS

| | | | |
|---|---|---|---|
| 2019/0379628 A1 | 12/2019 | Wu et al. | |
| 2020/0019840 A1 | 1/2020 | Guo et al. | |
| 2020/0065292 A1 | 2/2020 | Li et al. | |
| 2020/0274894 A1* | 8/2020 | Argoeti | G06F 7/556 |
| 2020/0388360 A1* | 12/2020 | Caffarel | G06Q 30/0282 |
| 2022/0016675 A1* | 1/2022 | Kumar | B07C 5/3422 |

OTHER PUBLICATIONS

Zhang, Zemin; "A novel algebraic framework for processing multidimensional data: Theory and application" Publication info: Tufts University. ProQuest Dissertations Publishing, 2017. 10253236. (Year: 2017).*

"Hierarchical Sparse Learning with Spectral-Spatial Information for Hyperspectral Imagery Denoising" Author: Liu, Shuai; Jiao, Licheng; Yang, Shuyuan Publication info: Sensors 16.10: 1718. MDPI AG. (2016) (Year: 2016).*

Structured Overcomplete Sparsifying Transform Learning with Convergence Guarantees and Applications Author: Wen, Bihan; Ravishankar, Saiprasad; Bresler, Yoram Publication info: International Journal of Computer Vision 114.2-3: 137-167. Springer Nature B.V. (Sep. 2015) (Year: 2015).*

Sampling of web images with dictionary coherence for cross-domain concept detection Author: Sun, Yongqing, Taniguchi, Yukinobu 1 ; Morimoto, Masashi, Hikarinooka, Yokosuka-shi Publication info: Germany: Springer Verlag, Dec. 1, 2013. (Year: 2013).*

An augmented Lagrangian multi-scale dictionary learning algorithm Author: Liu, Qiegen; Luo, Jianhua; Wang, Shanshan; Xiao, Moyan; Ye, Meng Publication info: EURASIP Journal on Advances in Signal Processing 2011 : 1-16. Springer Nature B.V. (Sep. 2011) (Year: 2011).*

Pending U.S. Appl. No. 16/782,349, filed Feb. 5, 2020, Beigi et al.

Boyd, et al., 2011. Distributed optimization and statistical learning via the alternating direction method of multipliers. Foundations and Trends® in Machine Learning 3, 1 (2011), 1-122.

Clauset, et al., 2009. Power-law distributions in empirical data. SIAM review 51, 4 (2009), 661-703.

Deng, et al., 2013. Personalized video recommendation based on cross-platform user modeling. In ICME'13. IEEE, 1-6.

Fernandez-Tobias, et al., 2012. Cross-domain recommender systems: A survey of the state of the art. In Spanish Conference on Information Retrieval.

Jamali, et al., 2009. Trustwalker: a random walk model for combining trust-based and item-based recommendation. In KDD'09. ACM, 397-406.

Jennings, et al., 1992. Matrix computation. John Wiley & Sons Inc.

Koren, 2008. Factorization meets the neighborhood: a multifaceted collaborative filtering model. In KDD'08. ACM, 426-434.

Lee, et al., 2006. Efficient sparse coding algorithms. In NIPS. 801-808.

Li, et al., 2009. Can Movies and Books Collab¬orate? Cross-Domain Collaborative Filtering for Sparsity Reduction . . . In IJCAI, vol. 9. 2052-2057.

* cited by examiner

SYSTEMS AND METHODS FOR A CROSS MEDIA JOINT FRIEND AND ITEM RECOMMENDATION FRAMEWORK

CROSS REFERENCE TO RELATED APPLICATIONS

This is a non-provisional application that claims benefit to U.S. provisional application Ser. No. 62/713,743 filed on Aug. 2, 2018, which is herein incorporated by reference in its entirety.

GOVERNMENT SUPPORT

This invention was made with government support under N000014-16-1-2257 awarded by the Office of Naval Research. The government has certain rights in the invention.

FIELD

The present disclosure generally relates to cross media recommendation, and in particular to systems and methods for cross media joint friend and item recommendations.

BACKGROUND

Friend and item recommendation on social media sites is an important task, which not only brings convenience to users but also benefits platform providers. However, the process of recommendation for newly-launched social media sites can be challenging as they often lack user historical data and encounter data sparsity and cold-start problems. Thus, it is important to exploit auxiliary information to help improve recommendation performances on these sites. Existing approaches try to utilize the knowledge transferred from other mature sites, which often require overlapped users or similar items to ensure an effective knowledge transfer. However, these assumptions may not hold in practice because 1) overlapped user sets are often unavailable and costly to identify due to the heterogeneous user profile, content and network data, and 2) different schemes to show item attributes across sites can cause the attribute values to be inconsistent, incomplete, and noisy. Thus, the transferring of knowledge when no direct bridge is given between two social media sites remains a challenge. In addition, user-user relationships are widely used as side information to improve item recommendation, but the ability to exploit user-item interactions for friend recommendation is rather limited.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Various embodiments for a cross-media joint friend and item recommendation framework for capturing cross-platform knowledge transfer and within-platform correlations among user-user relations and user-item interactions are disclosed herein.

Social media websites provide users with multiple services such as online reviews, networking, social publishing, etc. To improve personalized services, social media sites often attempt to suggest potential information that will match the interests of users or potential friends that users will form relationships with. Recommender systems, which aim to solve the aforementioned problems, are attracting more and more attention in recent years. Mature social media sites have abundant historical information to help build recommender systems, whereas newly launched sites often lack historical information and encounter challenges of data sparsity and cold-start. To build effective and practical friend-and-item recommendation systems for the newly launched sites, it is natural and necessary to explore auxiliary information from different aspects.

Figure 1A:
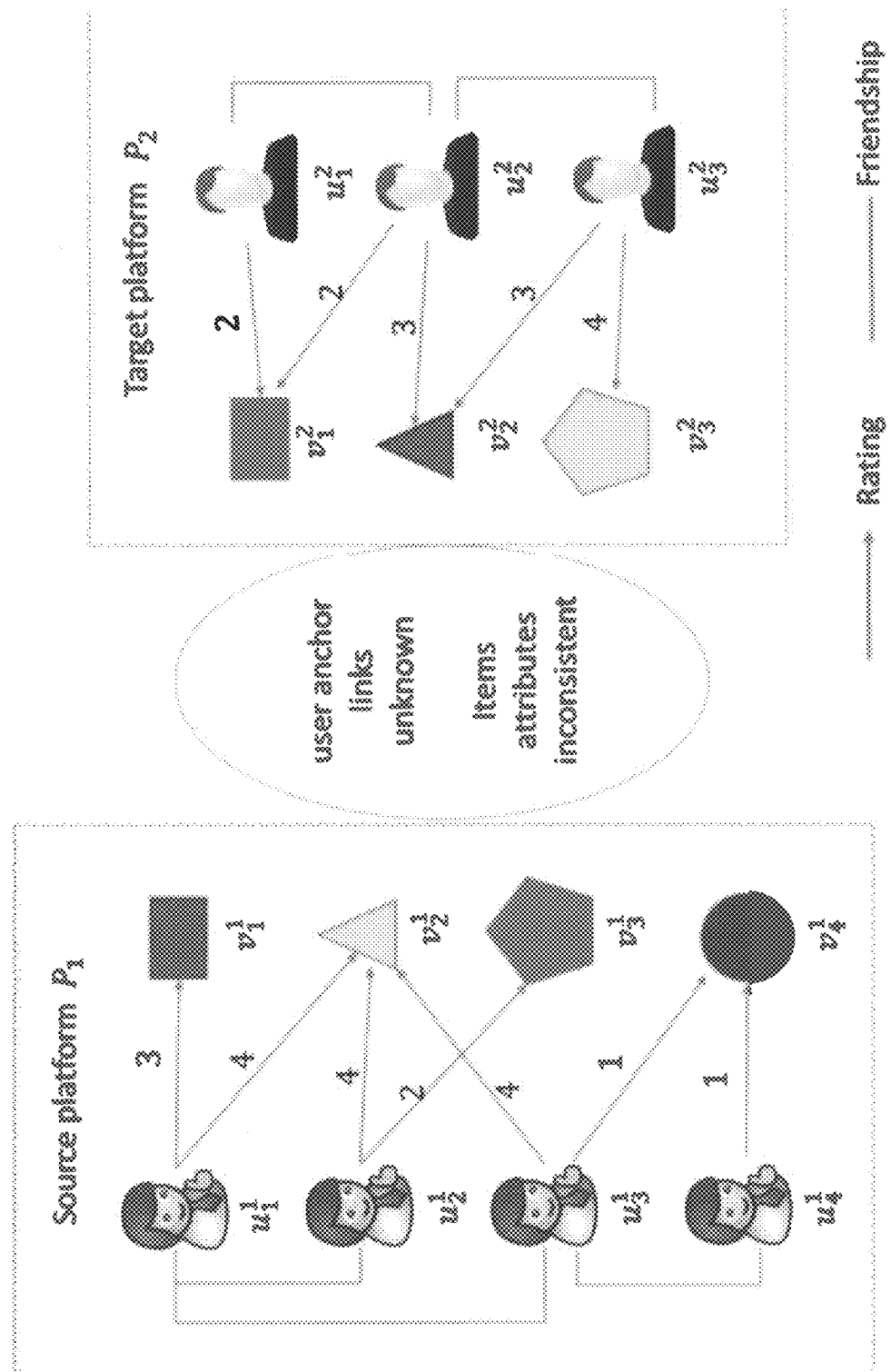
FIG. 1A is a simplified illustration of a problem scenario for cross-media joint friend and item recommendation and FIG. 1B is a simplified illustration showing a disclosed framework for integrating within-platform correlations and cross-platform information for joint recommendations.

One popular way of exploring auxiliary information is to transfer knowledge from a mature platform to a newly created platform by assuming that either (i) there are anchor links between users across two platforms and thus knowledge can be transferred through these anchor links; or (ii) item attributes are consistent and thus similarity between items can be directly utilized to transfer the knowledge. However, in practice, these assumptions may not hold. A typical scenario is shown in FIG. 1A, where $P_1$ is a mature platform and $P_2$ is a newly launched one. Users in $P_1$ can form a social network and give ratings to items in $P_1$. Similarly, users in $P_2$ can also form links and rate items in $P_2$. However, there are no anchor links between users in $P_1$ and users in $P_2$ and thus no information can be directly transferred between users in $P_1$ and $P_2$. In addition, directly measuring the similarity between items in $P_1$ and $P_2$ may not be applicable as different sites encode items in different schemes and result in inconsistent attribute fields and many missing values. The majority of existing work that exploits anchor links or item similarities cannot be directly applied. Therefore, it is important to study the novel and challenging problem of cross-platform recommendation when no direct bridge between users or items is given.

In addition to transferring knowledge across platforms, auxiliary information can be exploited within a single platform. As shown in FIG. 1A, on a social media site, users can usually form relationships with others as well as express their preferences to items. For example, on the site GoodReads, people can follow and be followed by other users and also give ratings to the books they read. According to social correlation theory, a user's preferences towards items and friends are often correlated. Homophily theory shows that users who have similar attributes are more likely to become friends. Likewise, social influence theory suggests that users are more likely to be influenced by their friends and express similar ratings to those items visited by their friends. However, even though much effort has been devoted to exploiting user-user relations to improve item recommendations, the ability to exploit user-item interactions for friend recommendation remains limited. A positive correlation is shown between a user's interests and social relationships, which may indicate an added value to utilize user interests to improve friend recommendations in social media. Thus, items and friends can be jointly recommended by exploiting the correlations among them. As shown in FIG. 1A, suppose $u_1^2$ and $u_2^2$ are friends, user $u_1^2$ is likely to be influenced by his/her friend $u_2^2$ and gives a similar rating to item $v_1^2$. In addition, user $u_2^2$ and $u_3^2$ both give a rating score 3 to item $v_2^2$, so they are more likely to form a relationship.

Cross-platform knowledge transfer and within-platform joint learning have complementary information, which provides new perspectives to help improve the recommendation performance for a newly-launched platform. In this disclosure, two points are investigated: (1) the act of transferring the information from source platform to target platform when there is no straightforward way to bridge two platforms, and (2) the act of mathematically formulating joint friend and item recommendation such that recommendation performance is improved. To tackle these challenges, a cross-media joint friend and item recommendation framework is disclosed. The framework is operable to i) build the implicit bridge to transfer knowledge by utilizing the observation that the user behaviors share similar patterns across different networks and the assumption that item features on two platforms share the same dictionary; ii) learn user and item latent features by exploiting the correlation between user-user relations and user-item interactions to perform joint friend and item recommendations. The main contributions are as below:

A problem of cross-media joint friend and item recommendations were studied when no anchor links were available;

A framework is disclosed herein which integrates within-platform correlations and cross-media information into a coherent model for joint friend and item recommendations, and an optimization algorithm to solve it; and Experiments were conducted on real-world social media sites to demonstrate the effectiveness of the framework for friend and item recommendations.

Problem Formulation

The notations of the present disclosure will first be introduced, and then the formal problem definition will be introduced. Let $\mathcal{U}_1=\{u_1^1, u_2^1, \ldots, u_{n_1}^1\}$ and $\mathcal{V}_1=\{v_1^1, v_2^1, \ldots, v_{m_1}^1\}$ be the sets of users and items in the source social media site, where $n_1$ and $m_1$ are the numbers of users and items, respectively. $\mathcal{U}_2=\{u_1^2, u_2^2, \ldots, u_{n_2}^2\}$ and $\mathcal{V}_2=\{v_1^2, v_2^2, \ldots, v_{m_2}^2\}$ denote the sets of users and items in the target social media site where $n_2$ and $m_2$ denote the number of) users and items, respectively. $X_1 \in \mathbb{R}^{d \times m_1}$ and $X_2 \in \mathbb{R}^{d \times m_2}$ are also utilized to denote the item features in source and target domains, separately; where d is the dimension of item feature vectors. On each social media site, users can rate the items; $R_1 \in \mathbb{R}^{n_1 \times m_1}$ and $R_2 \in \mathbb{R}^{n_2 \times m_2}$ used to denote the user-item rating matrices for the source domain and target domain, respectively. Users can become friends with other users and $A_1 \in \{1,0\}^{n_1 \times m_1}$ and $A_2 \in \{1,0\}^{n_2 \times m_2}$ are used to denote the user-user adjacency matrices on the source and target social media site, respectively. A very common situation is that the source domain is a mature source media site while the target site is newly launched. Thus, the rating matrix $R_1$ and user-user adjacency matrix $A_1$ in the source domain are relatively dense while $R_2$ and $A_2$ in the target domain are very sparse. Much work has demonstrated that better user and item latent features can be learned with dense rating and user-user matrices for friend and item recommendations, while it is very difficult to make reasonable recommendations with very sparse rating matrices. Thus, $R_1$ and $A_1$ are used in the source domain to help friend and item recommendations in the target domain. It is assumed that there is no explicit correspondence information among users and items.

Given the rating matrix $R_1$, user-user link matrix $A_1$ and item-feature matrix $X_1$ in the source social media site, rating matrix $R_2$, user-user link matrix $A_2$ and item-feature matrix $X_2$ in the target social media site, it is aimed to make friend and item recommendations on the target social media site.

Cross Media Joint Recommendations

Figure 1B:
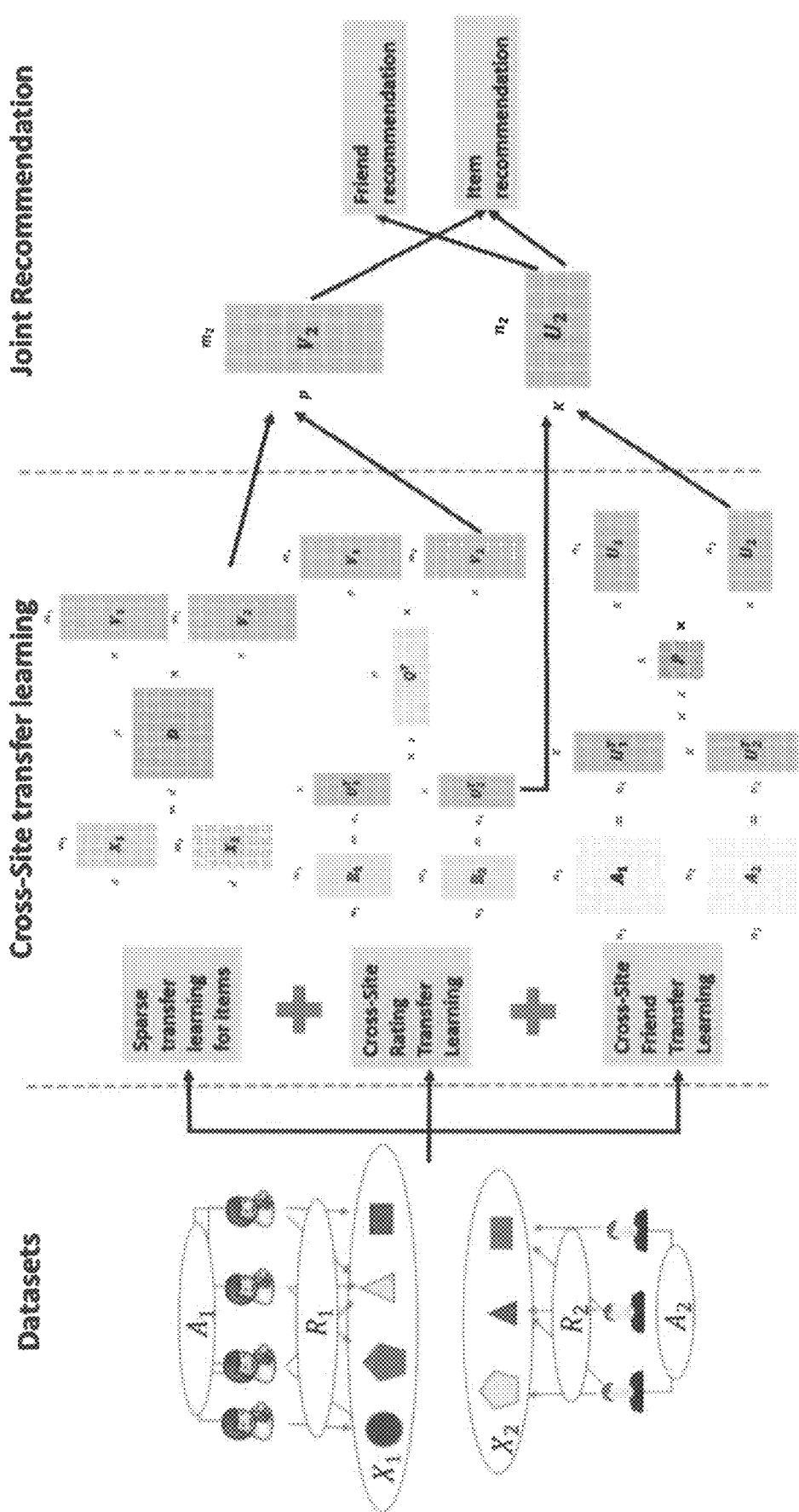
Figure 2A:
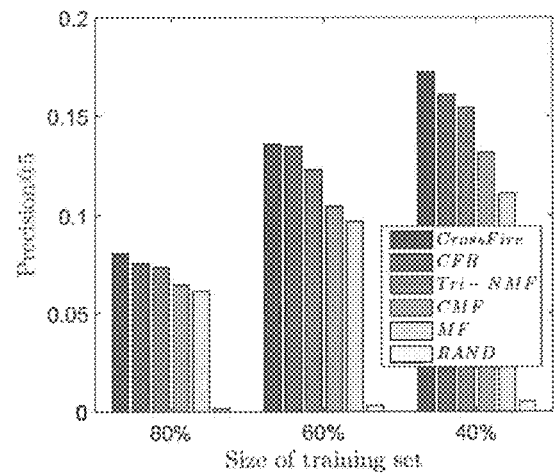
FIGS. 2A-2D are graphical representations for Precision@5, Recall@5, Precisions@10 and Recall@110 on Ciao.
Figure 2B:
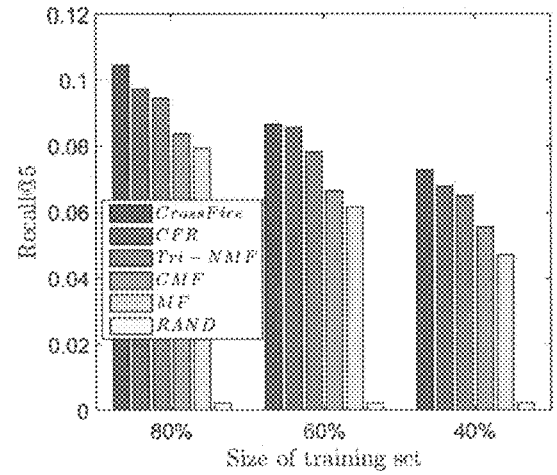
Figure 2C:
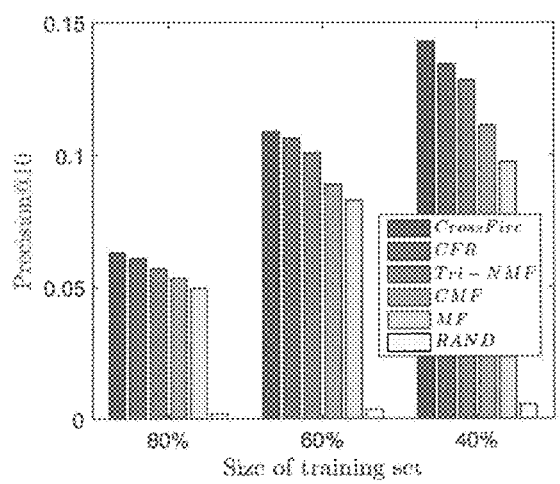
Figure 2D:
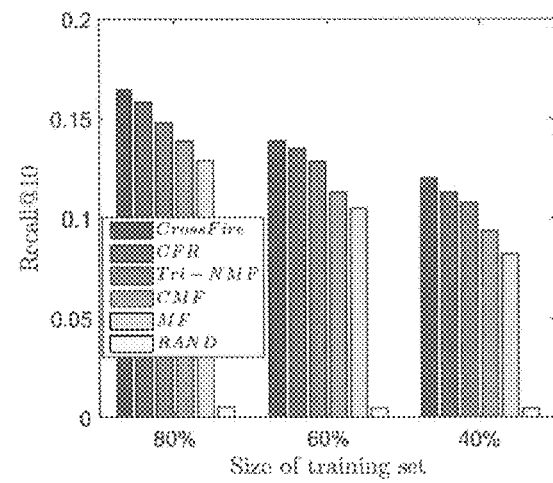
Figure 3A:
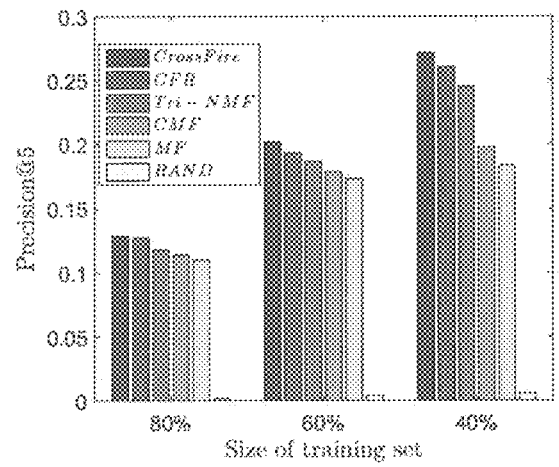
FIGS. 3A-3D are graphical representation for Precision@5, Recall@5, Precisions@10 and Recall@110 on BookLikes.
Figure 3B:
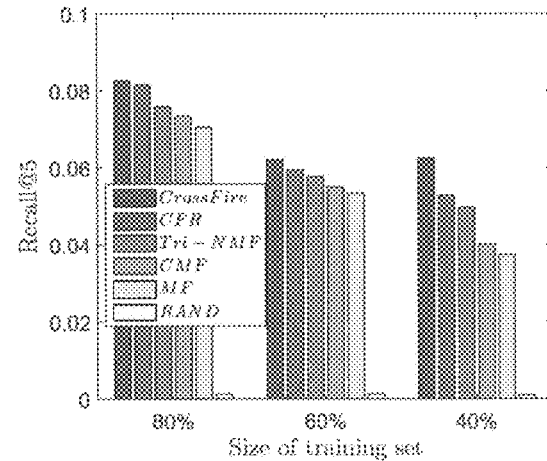
Figure 3C:
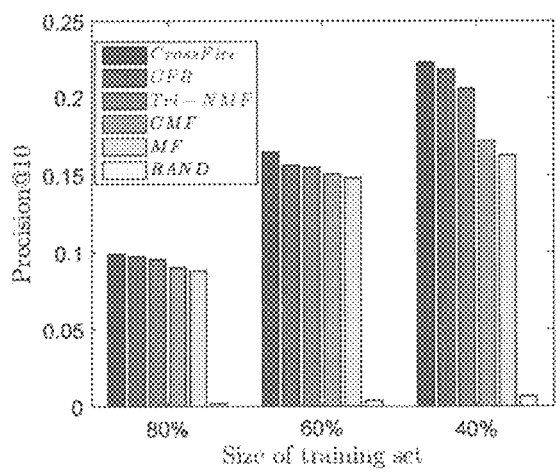
Figure 3D:
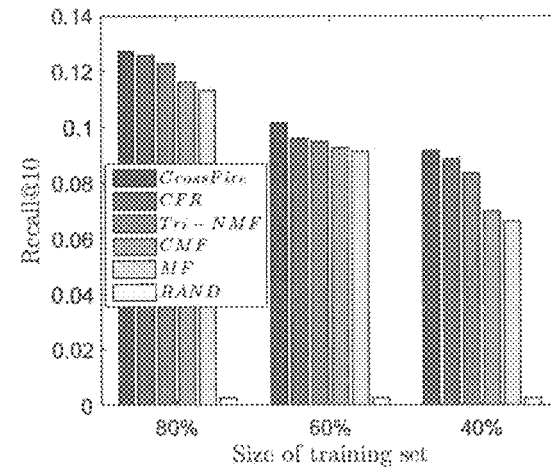

The details of disclosed framework for cross-media joint friend and item recommendations will be discussed. As shown in FIG. 1B, the disclosed framework includes three major parts. The present disclosure first introduces a method of exploiting a sparse transfer learning method to model cross-media item information. Then a method of cross site rating transfer learning will be discussed. Finally, the cross site friend transfer learning method is disclosed followed by the disclosed framework.

Sparse Transfer Learning for Items

Different online social network sites have different structures and schemes to present item detail attributes, which causes the inconsistent attribute fields and many missing values. Thus, it becomes ineffective to bridge items across sites directly using similarity metrics, such as distance and frequency on these attributes. To make the bridge between items on two social network sites, a sparse learning based transfer learning approach is used. Specifically, the source feature matrix $X_1$ can be reconstructed as $X_1 \approx DV_1$ and the target matrix $X_2$ is reconstructed as $X_2 \approx DV_2$, where $D \in \mathbb{R}^{d \times p}$ is the dictionary shared by source and target platforms, $V_1 \in \mathbb{R}^{p \times m_1}$ and $V_2 \in \mathbb{R}^{p \times m_2}$ are the sparse representations for $X_1$ and $X_2$, respectively. The essential idea is that $X_1$ and $X_2$ share a dictionary D, which behaves as a bridge to transfer knowledge from $X_1$ to $X_2$. With this assumption, the sparse learning objective is given as:

$$\min_{D,V_1,V_2} \|X_1 - DV_1\|_F^2 + \|X_2 - DV_2\|_F^2 + \gamma(\|V_1\|_1 + \|V_2\|_1) \quad (1)$$

$$\text{s.t. } \|d_j\|_2^2 \leq 1, j = 1, \ldots, p$$

where $d_j$ is the $j_{th}$ column of D.

To make the dictionary matrix D satisfy the intrinsic geometric structure of the item features, a Graph Regularized Sparse Coding (GraphSC) method is incorporated. The basic assumption of GraphSC is that if two data points $x_i$ and $x_j$ are close in the intrinsic geometry of data distributions, their codings $v_i$ and $v_j$ are also close. Thus, given $x=[x_1,x_2] \in \mathbb{R}^{d \times (m_1+m_2)}$, GraphSC constructs a K-nearest neighbor graph G with $(m_1+m_2)$ nodes representing all data points. Let H be the weight matrix of G; if $x_i$ is among the K-nearest neighbors with $x_j$, then $$H_{ij} = \exp{\frac{-\|x_i - x_j\|_2}{\sigma}} \sigma$$

is the scalar to control the bandwidth; otherwise, $H_{ij}=0$. Then the graph regularization term tries to minimize $$\frac{1}{2}\sum_{i,j=1}^{m_1+m_2}\|v_i-v_j\|^2 H_{ij}=Tr(VLV^T) \quad (2)$$

where $V=[V_1, V_2]$. $L=S-H$ is the Laplacian matrix and S is a diagonal matrix with the diagonal element= $s_{ij}=\Sigma_{j=1}^{m_1+m_2}H_{ij}$. Moreover, to enforce unified codings for both domains, the model is also regularized with an additional term called maximum mean discrepancy regularization as follows, $$MMD=\left\|\frac{1}{m_1}V_1 1-\frac{1}{m_2}V_2 1\right\|_2^2=Tr(VMV^T) \quad (3)$$

which is the $l_2$-norm of the difference between mean samples of the source and target domains in the sparse coding space. M is the MMD matrix and is computed as $M_{ij}=1/m_1^2$ if $v_i, v_j \in \mathcal{V}_1$, $M_{ij}=1/m_2^2$ if $v_i, v_j \in \mathcal{V}_2$ and $$\frac{-1}{m_1 m_2}$$

otherwise.

The graph regularization term in Eq. (2) and the MMD regularization term in Eq. (3) together guide the learning process of D and V so that the probability distribution of both domains are drawn close under the new representation V. Thus, the sparse transfer learning for items can be formulated as, $$\min_{V_1,V_2,D}\|X_1-DV_1\|_F^2+\|X_2-DV_2\|_F^2+ \quad (4)$$

$$\gamma(\|V_1\|_1+\|V_2\|_1)+Tr(V(\mu L+\nu M)V^T),$$

$$\text{s.t. } \|d^i\|_2^2 \le 1, i=1,\ldots,p$$

wherein μ and ν are used as a trade-off for the contributions of graph regularization term and MMD, and γ is to control the level of sparsity.

Cross Site Rating Transfer Learning

A transfer learning model is disclosed herein to better learn user and item latent representations. With sparse representations of items for both the source and target domains, another projection matrix $Q^{p \times K}$ is introduced, which projects the sparse representations to the latent item feature representations, i.e., $Q^T V_1$ and $Q^T V_2$. Thus, the objective function of cross-media rating transfer learning can be formulated as below, $$\min_{U_1,V_1,U_2,V_2,Q}\|W_1\odot(R_1-U_1^T Q^T V_1)\|_F^2+\|W_2\odot(R_2-U_2^T Q^T V_2)\|_F^2 \quad (5)$$

$$\text{s.t. } Q^T Q = I$$

wherein ○ denotes the Hadamard product and $W_1$ ($W_2$) controls the contribution of $R_1$ ($R_2$). $U_1 \in \mathbb{R}^{K \times n}$:($U_2 \in \mathbb{R}^{K \times n_2}$) is the latent user feature representation matrix in source (target) platform. The orthogonal constraint on Q is to ensure that each column of Q is independent.

Cross Site Friend Transfer Learning

Research on cross social network analysis has demonstrated that different social network platforms may have similar network structures and characteristics, e.g., the number of user relations falls into power-law distributions. The user-user link matrices $A_1$ and $A_2$ are decomposed in order to map them to a shared latent space and obtain latent user features $U_1$ and $U_2$. In order to model the latent features shared across different social media sites, a shared interaction matrix P is also exploited. Then, the modeling formulation is, $$\min_{U_1,U_2,P}\|Y_1\odot(A_1-U_1^T PU_1)\|_F^2+\|Y_2\odot(A_2-U_2^T PU_2)\|_F^2 \quad (6)$$

where ○ denotes the Hadamard product and $Y_1$ ($Y_2$) controls the contribution of $A_1$ ($A_2$). The essential idea of using shared P is that: P is the interaction matrix which captures the interaction property of users, i.e., the connection status of $u_s^i$ and $u_t^i$ is represented via the interaction matrix P as $U_i(s,i)^T PU_j(i,t)$. Since users' connection behaviors are consistent in different sites, e.g., the structure of social networks are similar, P should also be similar across sites.

Disclosed Framework

The three aforementioned components will be discussed together, and the disclosed framework of cross-media joint friend and item recommendations named. The disclosed framework aims to solve the following:

$$\min_\theta \underbrace{\sum_{i=1}^2 \|X_i-DV_i\|_F^2+\gamma\|V_i\|_1+Tr(V(\mu L+\nu M)V^T)+}_{\text{Item Sparse Transfer Learning}} \quad (7)$$

$$\underbrace{\alpha\sum_{i=1}^2 \|W_i\odot(R_i-U_i^T Q^T V_i)\|_F^2+\lambda(\|P\|_F^2+\|Q\|_F^2)+}_{\text{Cross-Media Item Recommendation}}$$

$$\underbrace{\beta\sum_{i=1}^2 \|Y_i\odot(A_i-U_i^T PU_i)\|_F^2+\lambda\sum_{i=1}^2\|U_i\|_F^2}_{\text{Cross-Media Friend Recommendation}}$$

$$\text{s.t. } \|d_j\|_2^2 \le 1, j=1,\ldots,p, Q^T Q=I$$

where the first part is to perform item sparse transfer learning; the second part captures the cross-media rating transfer learning; the third term models the user relations transfer learning. By incorporating these components together, it is possible to make joint recommendations for items and friends simultaneously with the resultant latent features.

Optimization Framework

The details of the optimization process for the disclosed framework will now be discussed. If the variables jointly are updated, the objective function in Eq. 7 is not convex. Thus, alternating least square method will be used to iteratively optimize each variable separately. Next, the updating rules will be introduced. For simplicity, $\mathcal{L}$ is used to denote the objective function in Eq. 7.

Update Rules

In this section, the updating rules for each variable will be discussed in detail.

Updating D:
The objective function related to D can be rewritten as, $$\min_{D} \|X - DV\|_F^2 \text{ s.t. } \|d_j\|_2^2 \le 1, j = 1, \ldots, p \tag{8}$$

where $X=[X_1, X_2]$ and $V=[V_1, V_2]$. Eq. (8) is a standard dictionary learning problem.

Updating V: Since updating V involves the $l_1$ norm, Alternating Direction Method of Multiplier (ADMM) is used to update V. By introducing an auxiliary variable Z=V and $\tilde{L}=\mu L+vM$, the objective function can be rewritten as follows, $$\min_V \underbrace{\|X - DV\|_F^2 + Tr(V\tilde{L}V^T) + \alpha \sum_{i=1}^{2} \|W_i \odot (R_i - U_i^T Q^T V_i)\|_F^2}_{g(V)} + \underbrace{\gamma\|Z\|_1}_{h(Z)} \tag{9}$$

$$\text{s.t. } V - Z = 0$$

This is a standard $l_1$ regularized ADMM problem. The updating function from step t to step t+1 is, $$V^{t+1} := \text{argmin}(g(V)+\rho/2\|V-Z^t+E^t\|_F^2) \tag{10}$$

$$Z^{t+1} := T_{\gamma/\rho}(V^{t+1}+E^t) \tag{11}$$

$$E^{t+1} := E^t + V^{t+1} - Z^{t+1} \tag{12}$$

where $\rho$ is the trade-off parameter and $T_{\gamma/\rho}(V)$ is the proximal function for norm (i.e., soft-thresholding operator) [19] defined as follows, $$[T_{\gamma/\rho}(V)]_{ij} = \text{sign}(V_{ij})(|V_{ij}|-\gamma/\rho)+ \tag{13}$$

To solve Eq. 10, gradient descent method is used to update V as in Algorithm 1. The partial derivative of updating V is, $$\frac{\partial \mathcal{L}}{\partial V} = 2D^T(DV - X) + VL + \rho(V - Z + E) +$$
$$2\alpha[QU_1[W_1 \odot (U_1^T Q^T V_1 - R_1)], QU_2[W_2 \odot (U_2^T Q^T V_2 - R_2)]]$$

---

Algorithm 1 Update V

---

Require: Initial feasible V, Z, E, $\rho = 0.5$, $\gamma$, maxsteps
Ensure: Updated V
1: for t = 1 to maxsteps do
2:     Update $V^{t+1}$ using $V^{t+1} = V^t - \epsilon \frac{\partial \mathcal{L}}{\partial V}$ via Eq. 14
3:     Update $Z^{t+1}$ via Eq. 11
4:     Update $E^{t+1}$ via Eq. 12
5: end for
6: Return V

---

Updating $U_i$ and P: The partial derivative of the objective function w.r.t $U_i$ is given as $$\frac{1}{2}\frac{\partial \mathcal{L}}{\partial U_i} = \alpha Q^T V_i[W_i \odot (U_i^T Q V_i - R_i)]^T + \lambda U_i + \tag{14}$$
$$\beta P^T U_i[Y_i \odot (U_i^T P U_i - A_i)] + \beta P U_i[Y_i \odot (U_i^T P U_i - A_i)]^T$$

and the partial derivative of the objective function w.r.t P is $$\frac{1}{2}\frac{\partial \mathcal{L}}{\partial P} = \beta \sum_{i=1}^{2}[U_i(Y_i \odot U_i^T P U_i)U_i^T - U_i(Y_i \odot A_i)U_i^T] + \lambda P \tag{15}$$

Updating Q: The objective function with respect to Q is as follows, $$\min_Q \alpha \sum_{i=1}^{2} \|W_i \odot (R_i - U_i^T Q^T V_i)\|_F^2 + \lambda\|Q\|_F^2 \text{ s.t. } Q^T Q = I \tag{16}$$

A gradient descent optimization procedure with curvilinear search is used to solve it. The gradient can be calculated as, $$G = \frac{\partial \mathcal{L}}{\partial Q} = 2\alpha \sum_{i=1}^{2} V_i[W_i \odot (U_i^T Q^T V_i - R_i)]^T U_i^T + 2\lambda Q \tag{17}$$

$F \in \mathbb{R}^{K \times K}$ is then defined as $F=GQ^T-QG^T$. Note that $F^T=-F$ and thus F is skew-symmetric. The next new point can be searched as a curvilinear function of a step size variable $\tau$ such that, $$S(\tau) = \left(I + \frac{\tau}{2}F\right)^{-1}\left(I - \frac{\tau}{2}F\right)Q \tag{18}$$

---

Algorithm 2 Update Q

---

Require: Initial feasible Q, $0 < \mu < 1, 6 < \rho_1 < \rho_2 < 1$
Ensure: Updated Q
1: Compute F, G, $\mathcal{L}'_\tau(S(0))$ respectively; set $\tau = 1$
2: for s = 1 to maxsteps do
3:     Compute $S(\tau)$ via Eq(18), $\mathcal{L}'_\tau(S(\tau))$ via Eq.(20)
4:     if Armijio-Wolfe conditions are satisfied then break-out
5:     end if
6:     $\tau = \mu\tau$
7: end for
8: Update Q as Q = S
9: Return Q

---

Algorithm 3 The optimization process of CrossFire framework

---

Require: $\{X_i, R_i, A_i\}_{i=1,2}$, $\alpha$, $\beta$, $\gamma$, $\lambda$, $\mu$, $\nu$
Ensure: $\{U_i, V_i\}_{i=1,2}$, P, Q, D
1: Initialize $\{U_i, V_i\}_{i=1,2}$, P, Q, D
2: Precompute L, M and $L = \mu L + vM$
3: repeat
4:     Update D via algorithm proposed in [8]
5:     Update $V_1, V_2$ with Algorithm 1
6:     Update $U_1, U_2$ as $U_i \leftarrow U_i - \epsilon\frac{\partial \mathcal{L}}{\partial U_i}$ using Eq. 14
7:     Update P as $P \leftarrow P - \epsilon\frac{\partial \mathcal{L}}{\partial P}$ using Eq. 15
8:     Update Q via Algorithm 2
9: until Convergence

---

It can be proved that $S(\tau)$ is orthogonal based on Cayley transformation. Thus, it remains in the feasible region along the curve defined by $\tau$. A proper step size $\tau$ is determined by satisfying the following Armijo-Wolfe conditions, $$\mathcal{L}(S(\tau)) \leq \mathcal{L}(S(0)) + \rho_1 \tau \mathcal{L}_\tau'(S(0)), \mathcal{L}_\tau'(S(\tau)) \geq \rho_2 \mathcal{L}_\tau'(S(0)) \quad (19)$$

Here, $\mathcal{L}_\tau'(S(\tau))$ is the derivative of $\mathcal{L}$ w.r.t $\tau$ $$\mathcal{L}_\tau'(S(\tau)) = -Tr\left(R(\tau)^T\left(I + \frac{\tau}{2}F\right)^{-1} F \frac{Q + s(\tau)}{2}\right) \quad (20)$$

where $R(\tau) = \nabla_{S_\tau} \mathcal{L}(S(\tau))$. $S(0) = Q$ and thus $R(0) = \nabla_Q \mathcal{L}(Q) = G$. Therefore, $\mathcal{L}_\tau'(S(0)) = -\frac{1}{2}\|F\|_F^2$. Details of updating Q are shown in Algorithm 2.

Algorithm

The detailed algorithm to learn the parameters for the disclosed framework in Algorithm 3 will now be given. In line 1, the parameters $\{U_i, V_i\}_{i=1,2}$, P, Q and D are initialized. In line 2, graph Laplacian matrix L and MMD matrix M are pre-computed. Next, these parameters are updated sequentially from Line 4 to Line 8 until convergence. Note that $\epsilon$ is the learning rate for each iteration step. Finally, based on the resultant latent matrix representations of users and items, they can be used to perform friend and item recommendation tasks.

The convergence of the algorithm is guaranteed; the reason being that gradient descent is used to update the parameters iteratively, and the objective value will monotonically reduce. Note that the objective function in Eq. 7 is non-negative, so the disclosed algorithm will converge and it will achieve a local optimal value.

TABLE 1

The statistics of datasets

| Dataset | Book | | Movie | |
| --- | --- | --- | --- | --- |
| | Source | Target | Source | Target |
| Platform | GoodReads | BookLikes | Epinions | Ciao |
| # users | 7,490 | 3,853 | 5,588 | 2,126 |
| # items | 6,946 | 5,884 | 8,072 | 2,426 |
| # ratings | 199,915 | 134,525 | 109,804 | 24,012 |
| # user links | 120,790 | 96,327 | 215,916 | 43,362 |

Time Complexity

For the time complexity of disclosed algorithm, the parameter learning process is the main focus. For parameter D, the method that uses a Lagrange dual is adopted, which has been shown to be more efficient. The computation cost is approximately $O(d(m_1+m_2)p)$. Considering that ADMM is used to update V in Algorithm 1, the major cost is to update V and the cost is about $O(t(K(m_1+m_2)p+K(p+1)(m_1n_1+m_2n_2)+dp^2(m_1+m_2)+p(m_1+m_2)^2))$, where t is the number of iteration steps for updating V. The cost of updating $U_i$ is $O(Kpm_i+K^2n_i+Kn_i^2+Kn_im_i)$. Similarly, the cost of updating P is $O(K(n_1^2+n_2^2)+K^2(n_1+n_2))$. At last, Q is updated using Algorithm 8 and the computation cost is approximately $O(Kp(n_1+n_2)+(p+K)(n_1m_1+n_2m_2)+K^2(m_1+m_2))$.

Experimental Evaluation

In this section, experiments were conducted on real-world datasets to demonstrate the effectiveness of the disclosed framework. Specifically, the following research questions are considered:

Is the disclosed framework able to improve friend and item recommendation by exploiting within-platform correlations and cross-platform transferring information simultaneously?

How effective are cross-media learning and joint friend and item prediction, respectively, in improving the recommendation performance of the disclosed framework?

To answer the first question, the performance of friend and item recommendations of the disclosed framework was compared with the state-of-the-art friend and item recommender systems, respectively. The effects of cross-media recommendation and joint prediction were then investigated for the disclosed framework by doing parameter analysis to answer the second question.

Datasets

Both source and target sites were ensured to have the following information: user-item interactions, user-user relations, and item features. As shown in Table 1, two pairs of cross-media datasets were used to evaluate the disclosed framework, i.e., Book and Movie. The Book data is collected from two book review social media sites, GoodReads and BookLikes, using web crawlers from April 2017 to May 2017. Users on GoodReads and BookLikes can rate the books they read of score 1 to 5 and they can follow and be followed by others. The Movie dataset includes two item review sites Epinions and Ciao and public available. Only items that belong to movie category were kept. Users' ratings range from 1 to 5 and they can also establish social relations (trust relations). Since different schemes to show item attributes can cause the attribute values inconsistent and incomplete, only the most common text information for items, i.e., name and description, are assumed to be available. Thus, item features are represented using a "bag-of-words" model on the text. In the sense, it may not be applicable to directly compute similarity score on the attribute values since most of them are not available. Note that the source and target platform for each cross-media data were selected based on real-world popularities of those sites.

Friend Recommendation

Whether the disclosed framework can improve the performance of friend recommendation will now be discussed.

Experimental Settings: A fraction of x % positive user-user pairs are randomly chosen for training and use the remaining 1−x % of all links for testing, where x is varied in {80, 60, 40}. Top-k evaluation metrics are used to measure the recommendation performance. Specifically, the definition of Precision@k and $$\text{Recall@}k \text{ is given as Precision@}k = \frac{1}{|\mathcal{U}^t|} \sum_{u_i^t \in \mathcal{U}^t} \frac{|TopK(u_i^t) \cap \text{user}(u_i^t)|}{|TopK(u_i^t)|} \text{ and}$$

$$\text{Recall@}k = \frac{1}{|\mathcal{U}^t|} \sum_{u_i^t \in \mathcal{U}^t} \frac{|TopK(u_i^t) \cap \text{user}(u_i^t)|}{|TopK(u_i^t)|}$$

where $TopK(u_i^t)$ is the set of friends recommended to user $u_i^t$ on target platform that $u_i^t$ has not yet formed links in the training set. user($u_i^t$) indicates the set of users that have been formed links in testing set. In the experiment, k is set to 5 and 10, respectively.

Performance comparison of Friend Recommendation: The disclosed framework will now be compared with several state-of-the-art friend recommendation algorithms. MF, CMF, and Tri-NMF are the friend recommendation methods for single-platform, and CFR is a cross-platform friend recommendation method. Note that CMF is also the baseline of joint friend and item recommendation method.

RAND: This method recommends user links randomly.

MF: Matrix factorization method factorizes the link matrix A into two low rank latent matrices and predicts the links by the matrix reconstructed by them.

CMF: Collective matrix factorization is a matrix factorization model that jointly utilizes user-user social relation matrix A2 and user-item preference matrix R2. Note that user links are predicted as $U_2^T O_2$.

$$\min_{U_1,V_2,O_2} \alpha \|Y_2 \odot (A_2 - U_2^T O_2)\|_F^2 + \qquad (21)$$
$$\beta \|W_2 \odot (R_2 - U_2^T V_2)\|_F^2 + \lambda(\|U_2\|_F^2 + \|V_2\|_F^2 + \|O_2\|_F^2)$$

Tri-NMF: Nonnegative Matrix Tri-Factorization decomposes the link matrix A into two low rank matrices, i.e., latent user matrix U and user interaction matrix P. The user links are predicted as $u_2^T P U_2$.

CFR: CFR is a variant of the disclosed method without item feature sparse learning and cross-site item recommendation, which has the following optimization form.

Cross validation will be used to determine all the model parameters. For the disclosed framework, latent dimension is set as K=10, item sparse dimension p=256, α=0.001, β=1, γ=0.001, λ=0.01, μ=0.001, and ν=1. The experimental results are shown in FIGS. 2A-2D and 3A-3D. The following observations were made:

In general, with the increase of training ratio, the recommendation performance of prec@5 and prec@10 decreases. The reasons for the performance decrease were that 1) the set of new friend relations are different for different x %; 2) the difficulty of inferring new friend relations increase as the high sparsity of trust relations when training ratio is high, which can be supported by the performance of RAND. This observation is also consistent with previous work. In addition, recall@5 and recall@10 increase with the increase of training ratio. The reason for this increase is that both truly inferred friends and remaining friends are decreasing and the latter decrease faster.

CMF performs slightly better than MF, which shows that incorporating rating patterns to learn latent user features can help improve friend recommendation performance. In addition, Tri-NMF performs much better than MF, which indicates that factorizing user links with interaction matrix can better capture the user connection status. Moreover, cross-media friend recommendation method CFR performs better than other single-platform methods.

The disclosed framework achieves the best performance comparing with other baselines. For example, the disclosed framework gains 54.9%, 54.9%, 46.8%, 46.8% relative improvement compared with MF, in terms of Prec@5, Recall@5, Prec@10, Recall@10 respectively, with 40% training size. It indicates that the combination of cross-media and joint prediction can provide complementary information for friend recommendations.

Figure 4A:
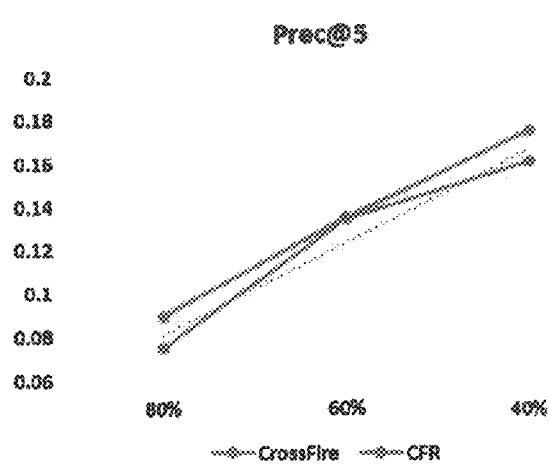
FIGS. 4A and 4B are graphical representations for model robustness for friend recommendations.
Figure 4B:
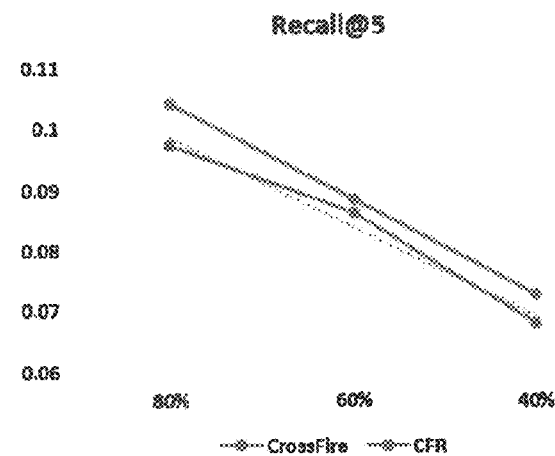
Figure 5A:
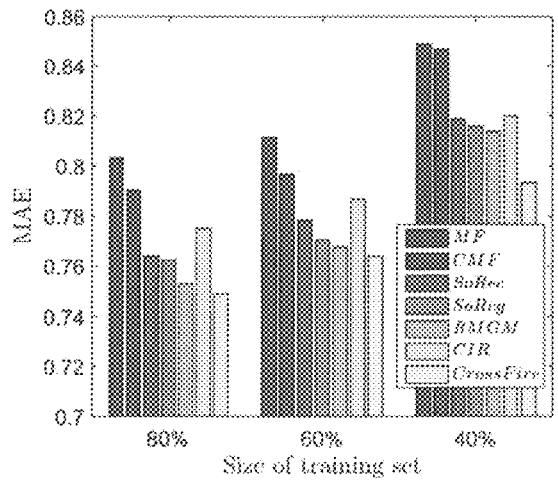
FIGS. 5A-5D are graphical representations for MAE, RMSE performances on Ciao and BookLikes.
Figure 5B:
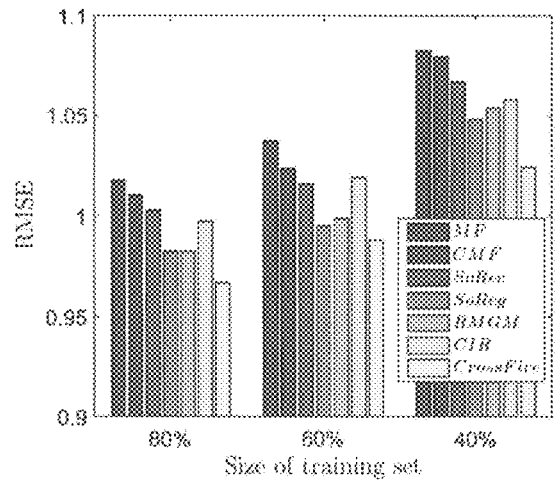
Figure 5C:
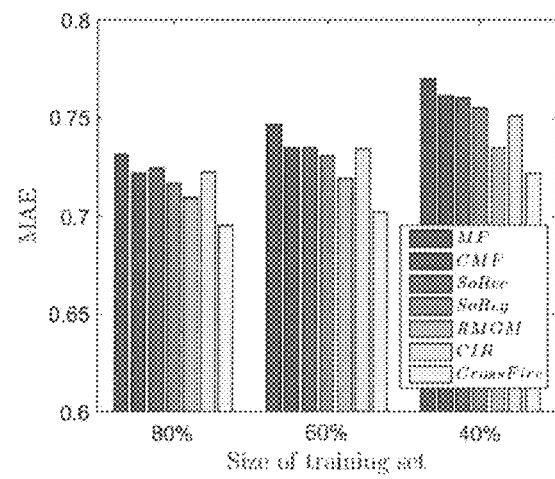
Figure 5D:
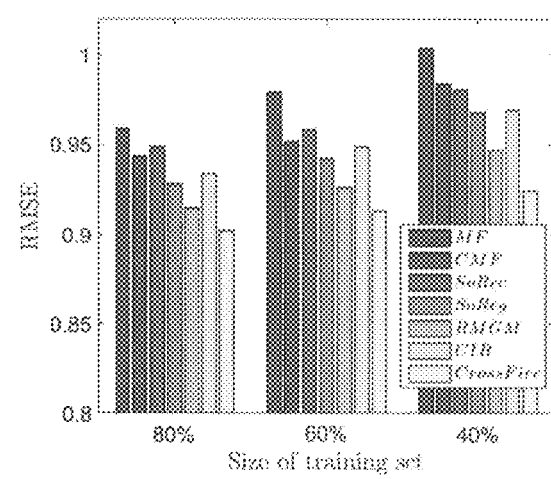

The disclosed framework is more robust compared with the best baseline CFR. In FIGS. 4A and 4B, it is shown that as training ratio changes, the performance change tendencies (represented by the dotted lines) in terms of prec@5 and recall@5 are more flat. This indicates that the disclosed framework is less sensitive to training data size and thus can better handle data sparsity problems for friend recommendations.

Item Recommendation

In this subsection, it is determined whether the disclosed framework can improve the performance of rating predictions.

Experimental Settings. A fraction of x % positive user-item pairs were randomly chosen for training and use the remaining 1−x % of all items for testing, where x is varied in {80, 60, 40}. Two popular metrics were used, the Mean Absolute Error (MAE) and the Root Mean Square Error (RMSE), to measure the recommendation quality of the disclosed approach comparing with other collaborative filtering and social recommendation methods. The metric MAE is defined as $$MAE = \frac{1}{T}\sum_{i,j}|R_{ij} - \hat{R}_{ij}|,$$

where $R_{ij}$ denotes the observed rating user $u_i$ gave to item $x_j$, and $\hat{R}_{ij}$ denotes the predicted rating, and T is the number of tested ratings. The RMSE is defined as $$RMSE = \sqrt{\frac{1}{T}\sum_{i,j}(R_{ij} - \hat{R}_{ij})^2}.$$

A smaller RMSE or MAE value means better performance. Note that previous work demonstrated that small improvement in RMSE and MAE terms can have a significant impact on the quality of top-few recommendation.

Performance Comparison of Item Recommendation. The disclosed framework was compared with the following state-of-the-art item recommendation methods, i.e., four single-platform method MF, CMF, SoRec, and SoReg, and two cross-platform transfer learning method, RMGM and CIR. CMF is also the baseline of joint friend and item recommendation method.

MF: It decomposes R into two low rank latent matrices and predicts the ratings by the matrix reconstructed by them. It is a variant of the disclosed framework without considering user relations, item attributes, and cross-platform similarities.

CMF: Collective matrix factorization is a matrix factorization model that jointly utilizes user-user social relation matrix A2 and user-item preference matrix R2. Note that item rating matrix is predicted as $u_i^T v_2$ as in Eqn 21.

SoRec: This method performs a co-factorization in user-rating matrix and user-user degree centrality relation confidence matrix by sharing same latent user factor through a probabilistic matrix factorization model.

SoReg: This method is based on matrix factorization model and adds a social regularization term as constraints to encode local social relation of users.

RMGM: Rating matrix generative model is the state-of-the-art transfer learning method, which learns a shared cluster-level user ratings patterns by jointly modeling rating matrices on multiple domains.

CIR: CIR is a variant of the disclosed method without cross-site friend recommendation.

Note that cross-validation is also used to determine the parameters for all baseline methods. For the disclosed framework, the latent factor dimension is set as K=10, α=1, β=0.001, γ=0.001, λ=0.01, μ=0.001, ν=1. The comparison results are demonstrated in FIGS. 5A-5D, the following observations were made.

Exploiting social relations as auxiliary information can help improve item recommendations. For example, CMF, SoRec, SoReg all performs better than MF. Note that the performance of CMF is worse than SoRec and SoReg. The reason is that SoRec and SoReg are both using social relation as side information to improve item recommendation performance; while CMF can perform joint friend and item recommendation and directly factorize user link matrix may not provide so much useful knowledge.

Exploiting cross-media information can significantly improve recommendation performances. It can be seen that RMGM and CIR perform significantly better than MF in terms of MAE and RMSE in all cases. In addition, it can be seen that RMGM>CIR holds in all cases, which indicates that modeling cluster-level rating pattern help more than item-level rating patterns.

The disclosed framework performs the best on both datasets in terms of MAE and RMSE on all training settings. For example, the disclosed framework obtains 6.55%, 5.41% relative improvement in terms of MAE and RMSE in Ciao with 40% as the training set. The major reason is that the disclosed framework exploits both cross-media information and joint prediction for recommendations, which have complementary information to improve item recommendations.

Figure 6A:
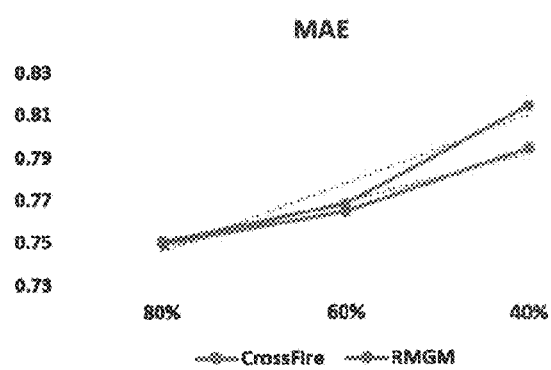
FIGS. 6A and 6B are graphical representations showing model robustness for item recommendation.
Figure 6B:
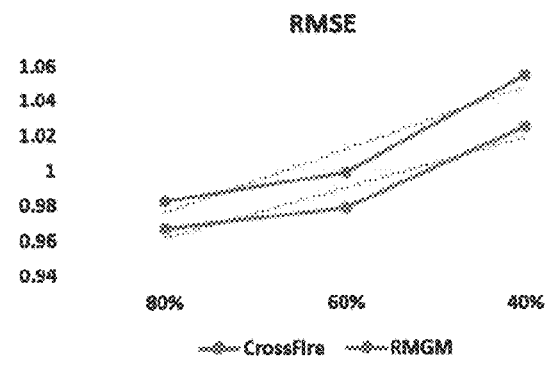
Figure 7A:
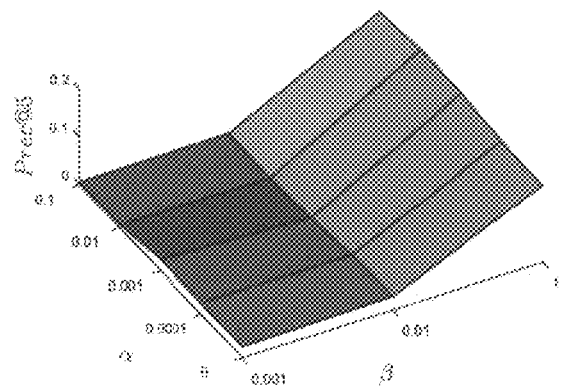
FIGS. 7A and 7B, are graphical representations of showing parameter sensitivity on friend recommendation with respect to $\alpha$ and $\beta$ on prec@5 and recall@5.
Figure 7B:
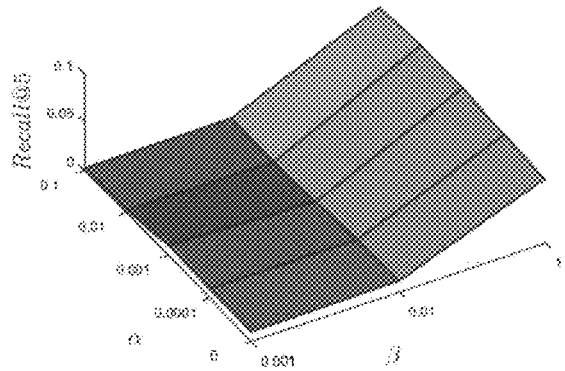
Figure 8A:
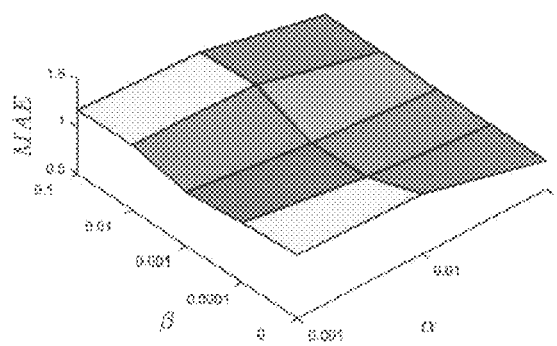
FIGS. 8A and 8B are graphical representations showing parameter sensitivity on item recommendation with respect to $\alpha$ and $\beta$ on MAE and RMSE.
Figure 8B:
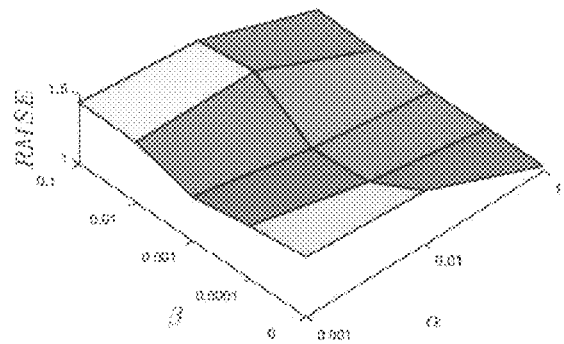

The disclosed framework is more robust compared with the best baseline RMGM. As shown in FIGS. 6A and 6B, it can be seen that as training ratio decreases, the performance decrease tendencies (represented by the dotted lines) are more flat. This indicates that the disclosed framework is less sensitive to training data size and thus can better handle data sparsity problems for item recommendations.

To sum up, it is concluded from the experiments that (1) the disclosed framework significantly improves both friend and item recommendation performances; and (2) modeling joint prediction and cross-media recommendation simultaneously provides complementary contributions to recommendation performance improvement.

Parameter Analysis

The parameter analysis for the disclosed framework will be discussed in greater detail. The present disclosure mainly focuses on the parameter sensitivities for $\alpha$ and $\beta$, as they are controlling the joint cross friend and item recommendation components, respectively. The other parameters are fixed when $\alpha$ or $\beta$ are changed. Due to the space limitation and similar observation for other settings, only the results when training ratio is 40% are shown and the results for prec@10 and recall@10 are omitted. For item recommendation, the values of $\alpha$ are varied as $\{1, 0.01, 0.001\}$ and $\beta$ as $\{0, 0.0001, 0.001, 0.01, 0.1\}$. Similarly, for friend recommendation, the values of $\beta$ are varied as $\{1, 0.01, 0.001\}$ and $\alpha$ as $\{0, 0.0001, 0.001, 0.01, 0.1\}$. The results for friend and item recommendations are shown in FIGS. 7A, 7B, 8A and 8B, respectively. The following observations were made: (1) When $\alpha=1$, item recommendation has relatively good performance; however, when $\alpha=0.01, 0.001$, the performance is much worse than MF. The reason is that $\alpha=1$ means that the cross item recommendation part dominants the feature learning process and the resultant latent features are mainly encoded by rating information. Similarly, $\beta=1$ ensures that latent user features are mainly encoded by user relations; (2) The performance of item recommendation is generally better when the value of $\beta$ is within [0.001, 0.01], similarly, for friend recommendation, $\alpha$ within [0.001, 0.01] gives better performance. These observations ease the parameter selection process.

Computing System

Figure 9:
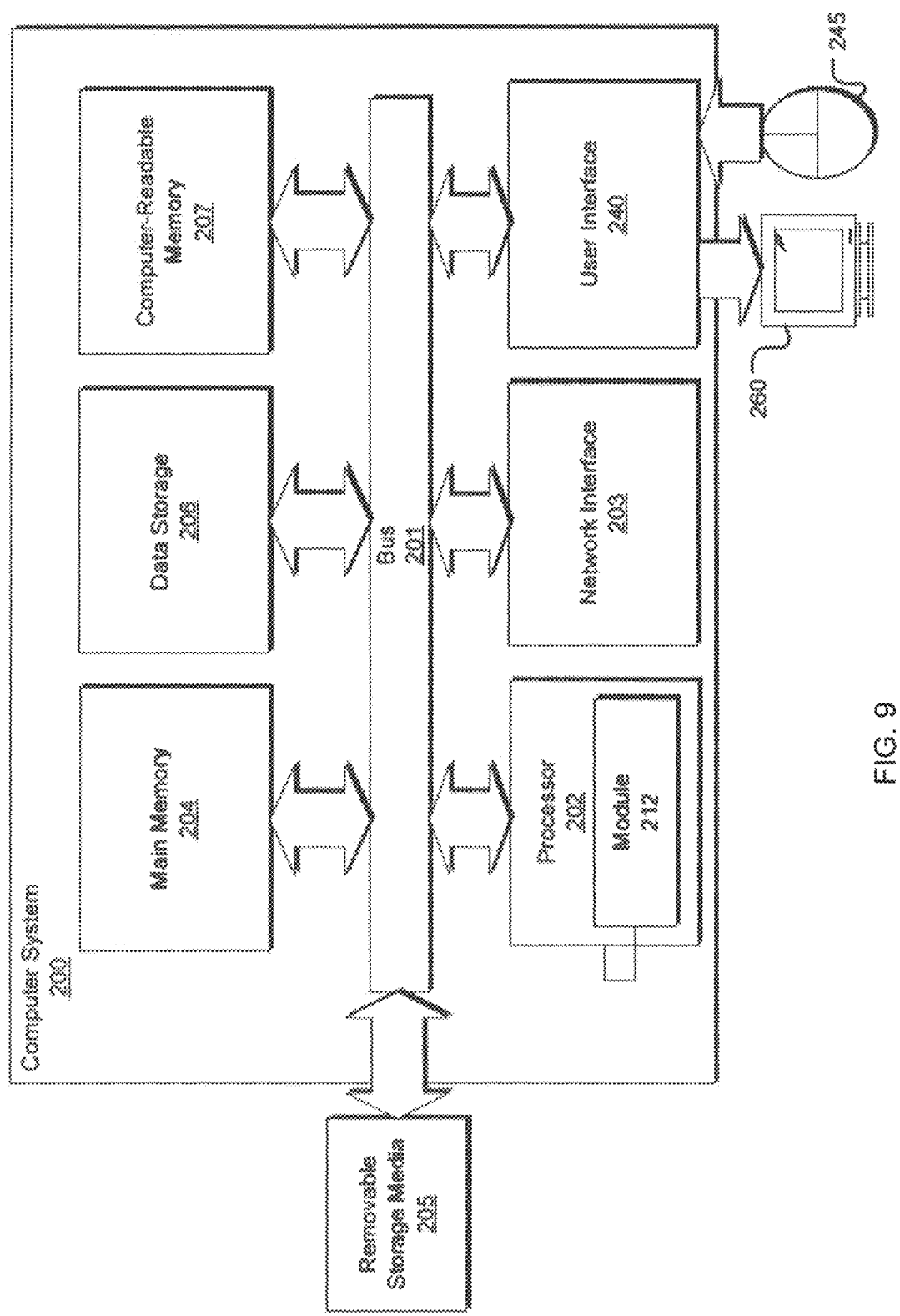
FIG. 9 is an example schematic diagram of a computing system that may implement various methodologies of the disclosed framework.

FIG. 9 illustrates an example of a suitable computing system 200 used to implement various aspects of the disclosed framework. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 212. Such modules 212 are hardware-implemented, and thus include at least one tangible unit capable of performing certain operations and may be configured or arranged in a certain manner. For example, a hardware-implemented module 212 may comprise dedicated circuitry that is permanently configured (e.g., as a special-purpose processor, such as a field-programmable gate array (FPGA) or an application-specific integrated circuit (ASIC)) to perform certain operations. A hardware-implemented module 212 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 212 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 212 are temporarily configured (e.g., programmed), each of the hardware-implemented modules 212 need not be configured or instantiated at any one instance in time. For example, where the hardware-implemented modules 212 comprise a general-purpose processor configured using software, the general-purpose processor may be configured as respective different hardware-implemented modules 212 at different times. Software may accordingly configure a processor 202, for example, to constitute a particular hardware-implemented module at one instance of time and to constitute a different hardware-implemented module 212 at a different instance of time.

Hardware-implemented modules 212 may provide information to, and/or receive information from, other hardware-implemented modules 212. Accordingly, the described hardware-implemented modules 212 may be regarded as being communicatively coupled. Where multiple of such hardware-implemented modules 212 exist contemporaneously, communications may be achieved through signal transmission (e.g., over appropriate circuits and buses) that connect the hardware-implemented modules. In embodiments in which multiple hardware-implemented modules 212 are configured or instantiated at different times, communications between such hardware-implemented modules may be achieved, for example, through the storage and retrieval of information in memory structures to which the multiple hardware-implemented modules 212 have access. For example, one hardware-implemented module 212 may perform an operation, and may store the output of that operation in a memory device to which it is communicatively coupled. A further hardware-implemented module 212 may then, at a later time, access the memory device to retrieve and process the stored output. Hardware-implemented modules 212 may also initiate communications with input or output devices.

As illustrated, the computing system 200 may be a general purpose computing device, although it is contemplated that the computing system 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 202, a main memory 204 (e.g., a system memory), and a system bus 201 that couples various system components of the general purpose computing device to the processor 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 200 may further include a variety of computer-readable media 207 that includes removable/non-removable media and volatile/nonvolatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processor 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method, comprising:
    linking items across a plurality of social network sites using a sparse transfer learning method, wherein the sparse transfer learning method uses a shared dictionary and a set of sparse item representations between a source social network site and a target social network site to obtain a set of source features and a set of target features;
    obtaining a set of latent user features and a set of latent item features, wherein the set of latent item features is obtained using a projection matrix on the set of sparse item representations and wherein the set of latent user features is obtained by mapping a set of user-user link matrices to a shared space; and
    solving an objective function, wherein the objective function comprises a plurality of variables and wherein the plurality of variables comprises the shared dictionary, the set of sparse item representations, the latent user features, the projection matrix, and a shared interaction matrix;
    wherein the objective function optimizes the plurality of variables.

2. The method of claim 1, wherein the solved objective function produces a resultant latent matrix representation of users and a resultant latent matrix representation of items and wherein the resultant latent matrix representation of users and the resultant latent matrix representation of items are respectively used to perform friend recommendation tasks and item recommendation tasks.

3. The method of claim 1, wherein the set of source features, the shared dictionary, the set of sparse representations, a graph Laplacian matrix, and a maximum mean discrepancy matrix are used to develop a first term of the objective function using the sparse transfer learning method.

4. The method of claim 3, further comprising:
    reconstructing a first matrix representative of the set of source features using the shared dictionary and a first matrix of the set of sparse item representations, wherein the first matrix of the set of sparse item representations belongings to the source social network site; and
    reconstructing a second matrix representative of the set of target features using the shared dictionary and a second matrix of the set of sparse item representations, wherein the second matrix of the set of sparse item representations belongings to the target social network site.

5. The method of claim 1, wherein the set of latent user features, a set of rating matrices, and the set of latent item features are used to create a second term of the objective function by modeling cross-site rating transfer between the source social network site and the target social network site, wherein cross-site rating transfer projects the set of sparse item representations to the set of latent item features using the projection matrix.

6. The method of claim 1, wherein the set of user-user link matrices, the shared interaction matrix, and the set of latent user features are used to create a third term of the objective function by modeling user relations transfer learning between the source social network site and the target social network site, wherein user relations transfer learning decomposes and maps the set of user-user link matrices to the shared space to obtain the set of latent user features, wherein the set of latent user features are modeled between the source social network site and the target social network site.

7. The method of claim 1, wherein the set of sparse item representations comprise sparse representations of item features inherent to the source social network site or the target social network site.

8. The method of claim 1, wherein the set of user-user link matrices are representative of user-user adjacency on the source social network site or the target social network site.

9. The method of claim 1, wherein the plurality of variables is iteratively updated until the objective function converges.

10. The method of claim 3, further comprising:
    computing the graph Laplacian matrix and the maximum mean discrepancy matrix, wherein the graph Laplacian matrix and the maximum mean discrepancy matrix are used to ensure that the shared dictionary fits an intrinsic geometry of the source social network site or the target social network site.

11. The method of claim 1, wherein an alternating least square method is used to iteratively optimize each of the plurality of variables of the objective function if the objective function is not convex.

12. A method, comprising:
    linking items across a plurality of social network sites using a sparse transfer learning method, the method comprising:
        reconstructing a first matrix representative of a set of source features using a shared dictionary and a first sparse item representation matrix, wherein the first sparse item representation matrix is representative of a first set of sparse item representations belonging to a source social network site;
        reconstructing a second matrix representative of a set of target features using the shared dictionary and a second sparse item representation matrix, wherein the second sparse item representation matrix is representative of a second set of sparse item representations belonging to a target social network site; and
        ensuring that the shared dictionary fits an intrinsic geometric structure of the set of source features or the set of target features using a graph regularized sparse coding algorithm;
    projecting the first and second sets of sparse item representations to a set of latent item feature representations using a projection matrix; and
    obtaining a first and second set of latent user features by decomposing a first and second user-user link matrix and incorporating a shared interaction matrix, wherein the first user-user link matrix is representative of user-user adjacency on the source social network site, and wherein the second user-user link matrix is representative of user-user adjacency on the target social network site;
    wherein an objective function is developed, wherein the objective function comprises the shared dictionary, the pair of sparse item representation matrices, the latent user features, the projection matrix, and the shared interaction matrix.

13. The method of claim 12, further comprising:
solving the objective function to produce a resultant latent matrix representation of users and a resultant latent matrix representation of items.

14. The method of claim 12, further comprising:
developing a first term of the objective function using the set of source features, the shared dictionary, the set of sparse representations, a graph Laplacian matrix, and a maximum mean discrepancy matrix, wherein the set of source features, the shared dictionary and the set of sparse representations are obtained using the sparse transfer learning method.

15. The method of claim 12, further comprising:
developing a second term of the objective function using the set of latent user features, a set of rating matrices, and the set of latent item feature representations.

16. The method of claim 12, further comprising:
developing a third term of the objective function using the set of user-user link matrices, the shared interaction matrix, and the set of latent user features.

\* \* \* \* \*